May 15, 1951          L. M. RAYNER          2,552,736
FLEXIBLE HARROW
Filed July 30, 1947          2 Sheets-Sheet 1
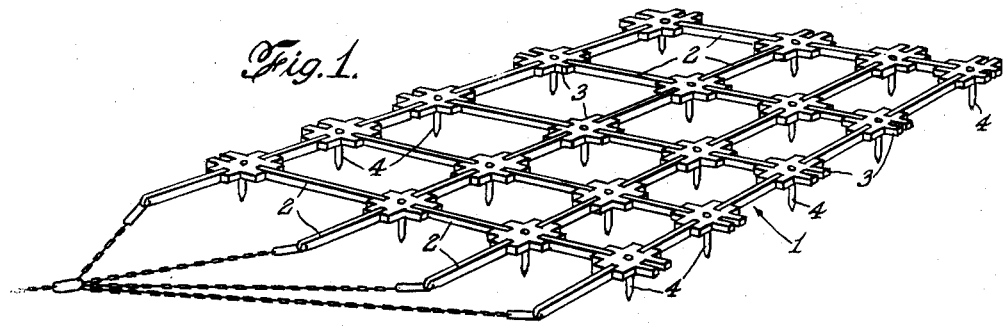
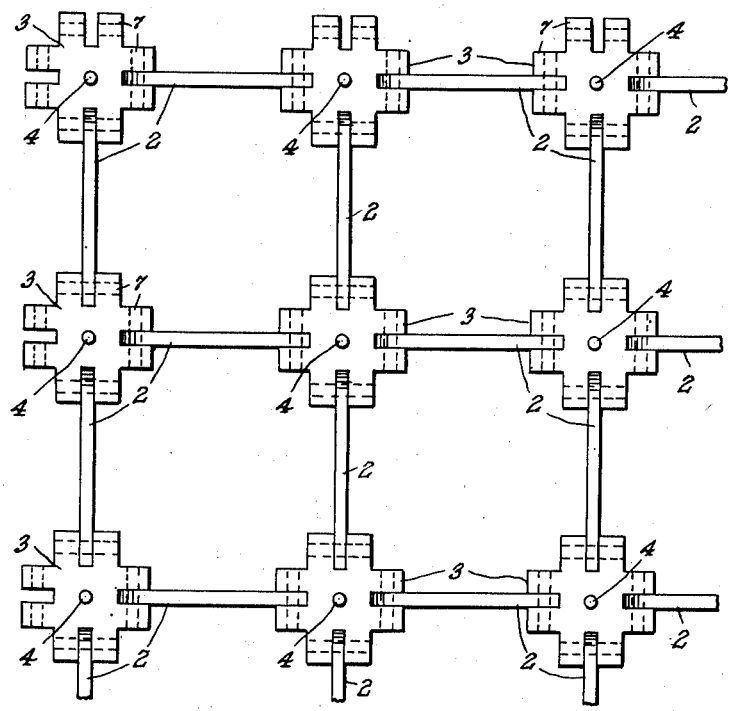
INVENTOR.
LEONARD M. RAYNER
BY
Edward T. Connors
ATTORNEY.

May 15, 1951         L. M. RAYNER         2,552,736
FLEXIBLE HARROW
Filed July 30, 1947                                      2 Sheets—Sheet 2
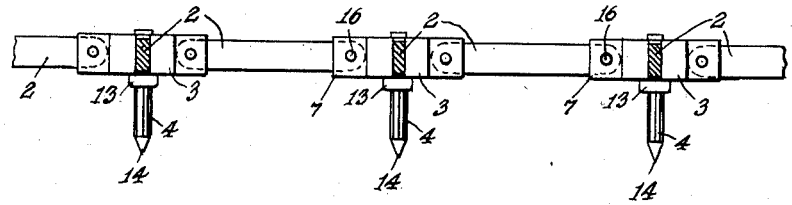
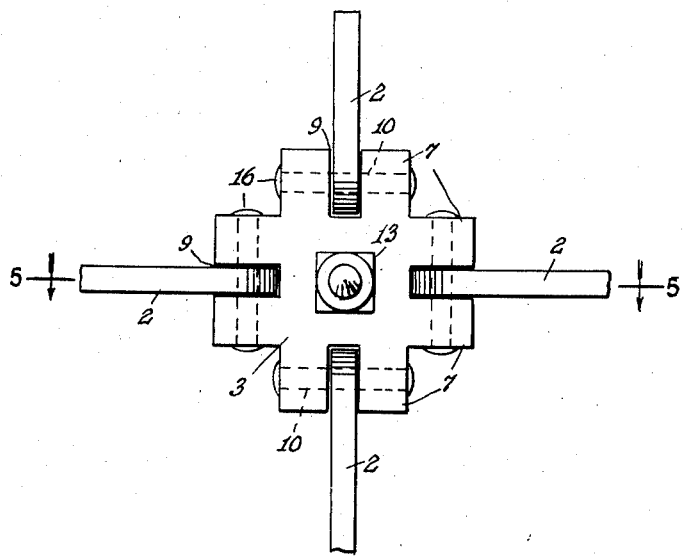
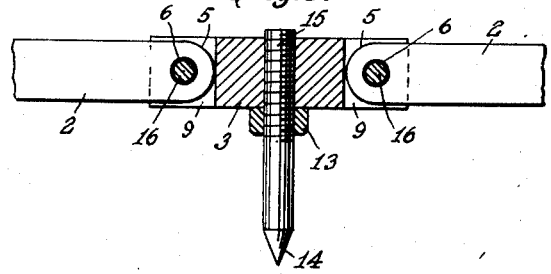
INVENTOR.
LEONARD M. RAYNER
BY
Edward T. Connors
ATTORNEY.

Patented May 15, 1951

2,552,736

UNITED STATES PATENT OFFICE 2,552,736

FLEXIBLE HARROW

Leonard M. Rayner, Cooperstown, N. Y.

Application July 30, 1947, Serial No. 764,773

2 Claims. (Cl. 55—32)

This invention relates to a new and improved flexible harrow.

The harrow with which the present invention is concerned is to be used on lawns and other grass plots, such as golf courses, and is particularly suitable for use on the greens of the golf courses. The harrow is provided with surface engaging members which are used for loosening the turf for aeration of the roots, for receding, or for the conditioning of the turf before the application of fertilizer, lime, or other soil stimulants.

A particular problem is presented by golf course greens which are small in size, and which have a surface varying in contour and covered with grass cut to a short height. It is essential that the grass covered surface be maintained in good condition over the entire area thereof.

While harrows have been provided heretofore, they have lacked the required degree of flexibility for the treatment of small areas such as golf greens and the like. By reason of lack of flexibility in desired directions, such devices are unable to follow the undulations of the greens whereby low spots in the green are missed while high spots are scraped excessively. Some of the prior devices have been formed with long armed cross members in which the cross members have been directly connected together. In such devices, in passing over an area of unequal contour, an entire line of the cross members must raise or lower together or the projecting teeth spread in a depressed portion of the surface or come together on a raised portion thereof. Other devices have been provided with lateral members connecting the cross members but the members have been so proportioned and connected together that the desired flexibility has not been attained.

The present invention aims to overcome the difficulties and disadvantages of prior devices by providing a flexible harrow suitable for small areas such as golf course greens and also for large areas such as the lawns of parks, and, further, is adaptable for loosening and smoothing the sand traps of golf courses.

An object of the invention is to provide a harrow suitable for use on surfaces of varying contour.

Another object of the invention is to provide a harrow in which each ground engaging member thereof is adapted to work independently and is maintained at the proper angle with respect to the surface with which it is used.

Another object of the invention is to provide a harrow made of a plurality of similar members so that the size or shape of the harrow may be varied as desired by adding or decreasing the number of the members or by shifting the positions thereof.

A further object of the invention is to provide a flexible harrow which is economical to manufacture, efficient in operation and durable in use. Other objects of the invention will be apparent from the following description and from the accompanying drawings which show, by way of example, an embodiment of the invention.

In accordance with the invention, the foregoing objects and advantages are accomplished by providing a harrow in which the parts thereof are connected together for freedom of movement with respect to each other in a vertical direction, yet which are held firmly in position against lateral or twisting movements. The harrow essentially comprises connecting links or bars which interconnect cross-like members for supporting the surface engaging members. The supporting members preferably are identical and each carries a ground engaging member such as a spike.

In the drawings:

Fig. 1 is a perspective view of a harrow in accordance with the invention.

Fig. 2 is a plan view of a corner section of the harrow.

Fig. 3 is a side view of the harrow section shown in Fig. 2.

Fig. 4 is an enlarged bottom view of a supporting member of the harrow, the connecting bars being broken away.

Fig. 5 is a sectional view taken substantially along the line 5—5 of Fig. 4.

Referring to the drawings there is shown a harrow 1 in accordance with the invention. The harrow comprises a plurality of identical connecting bars or links 2 attaching together a plurality of identical cross-like supporting members 3 which provide mounting means for ground engaging members or spikes 4.

The connecting bars or links 2 are made of any suitable material such as steel, brass or aluminum and may be of any desired length, a satisfactory length for use in treating golf course greens being found to be approximately three inches. The thickness of the link is preferably about three-sixteenths of an inch, while the width thereof is approximately one half inch, or about two and one-half times the thickness of the link. The ends of the links 2 are rounded as indicated at 5 (Fig. 5) and both ends are apertured as indicated at 6.

The supporting members or blocks 3 are also made of any suitable material such as steel, brass or aluminum and are formed in the shape of an equilateral cross, preferably with flat top and bottom surfaces. For treating golf greens, it has been found preferable to make the overall length and width of the cross members about two thirds of the length of the connecting links 2. The arms or legs 7 of the blocks 3 are preferably of a length equal to approximately one half of the width thereof. Each of the legs 7 is slotted vertically as indicated at 9 for its full length. The legs are formed with transversely extending apertures 10 positioned at approximately the midpoint thereof.

In order to support the ground engaging members or spikes 4, the blocks 3 are formed with vertically extending threaded apertures 11 extending from the top to the bottom thereof and positioned approximately in the center of the block.

The spikes 4 preferably are made of a wear resisting material such as a high carbon steel and are rod-like in shape. Each spike 4 has its lower end 14 pointed and its upper end 15 threaded for securement in a threaded aperture 11 of a block 3. It has been found preferable to make the length of the spike about equal to the length of the block 3, although it may be made of any desired length and is adjustable within the block 3 by its threaded engagement therewith. A nut 13 is threaded on each spike to lock the same in its adjusted position.

In assembling the harrow 1, the links 2 are connected into the slots 9 of the blocks 3 by means of rivets 16 or bolts, pins or other equivalent connecting means. The number of links and blocks to be used may be varied in number and position to form a harrow of any desired size or shape. The cross-like blocks or supporting members 3 are arranged in lengthwise and crosswise extending rows and the bars or links 2 are intermediate adjacent blocks in the same row. The bars by being disposed in the slots 9 can pivot upwardly and downwardly in a vertical plane but are retained against twisting or lateral movement. By reason of this construction, the harrow is flexible in a vertical plane and is substantially rigid in a horizontal plane.

In order to draw the harrow, chains 17 or other suitable means may be attached to the ends of the links 2 by removable eye members 19, or by other attaching means such as bolts. By varying the length of the chains 17, the harrow may be dragged at a bias so that the spikes will assume positions relative to the drag path equivalent to that produced by a closer spacing of the spikes.

From the foregoing description, it will be seen that the present invention provides a new and improved harrow which is so constructed that the ground engaging members or spikes are able to follow the undulations of surfaces of varying contour such as golf course greens. By reason of the construction in which the connecting links are movable only in vertical planes, the supporting members hold the spikes practically in the same positions and with the same spacings at all times thus assuring an even treatment of the entire surface being worked. The harrow is rugged in construction and can readily withstand any rough usage to which it may be subjected.

Although the present invention has been illustrated by way of example in connection with crosses having slotted arms for receiving the ends of the bars, it will be appreciated that the bars or links could be slotted for receiving the ends of the arms and thereby provide a connection for permitting flexibility in vertical planes and establishing rigidity in a horizontal plane and thus accomplish the objects and advantages of the invention in a like manner as heretofore described.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

I claim:

1. A flexible harrow comprising a plurality of cross-shaped members arranged in lengthwise and crosswise extending rows in a horizontal plane, each cross-shaped member having vertically slotted legs apertured in a horizontal plane; a connecting bar positioned between each pair of adjacent cross-shaped members in the same row, the connecting bar having its ends apertured and disposed in the slots of the cross-shaped members on each side thereof, and pin members extending through the apertures of said legs and said bars for rendering the harrow flexible in the vertical direction and substantially rigid in its horizontal plane.

2. A flexible harrow comprising a plurality of cross-shaped members arranged in lengthwise and crosswise extending rows in a horizontal plane, each cross-shaped member having vertically slotted legs apertured in a horizontal plane, a connecting bar positioned between each pair of adjacent cross-shaped members in the same row, the connecting bar having its ends apertured and disposed in the slots of the cross-shaped members on each side thereof, and pin members extending through the apertures of said legs and said bars for rendering the harrow flexible in the vertical direction and substantially rigid in its horizontal plane, the distance between apertures at opposite ends of said bars being greater than the distance between apertures of opposed legs of said members.

LEONARD M. RAYNER.

REFERENCES CITED

The following references are of record in the file of this patent:

UNITED STATES PATENTS

| Number | Name | Date |
|---|---|---|
| 141,021 | Walker | July 22, 1873 |
| 213,983 | English | Apr. 8, 1879 |
| 214,974 | Whitney | Apr. 29, 1879 |
| 278,632 | Thronson | May 29, 1883 |